(12) United States Patent
Moroney

(10) Patent No.: US 6,919,905 B2
(45) Date of Patent: Jul. 19, 2005

(54) METHOD AND DEVICE FOR VISUAL CALIBRATION OF DISPLAYS

(75) Inventor: Nathan M. Moroney, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 266 days.

(21) Appl. No.: 09/968,235

(22) Filed: Sep. 28, 2001

(65) Prior Publication Data

US 2003/0063098 A1 Apr. 3, 2003

(51) Int. Cl.$^7$ ................................................ G09G 5/02
(52) U.S. Cl. ...................... 345/589; 345/591; 345/593; 345/597
(58) Field of Search ................................ 345/589, 591, 345/593, 597

(56) References Cited

U.S. PATENT DOCUMENTS 5,087,966 A * 2/1992 Harradine .................... 358/27

2003/0071919 A1 * 4/2003 Braun ........................ 348/618

* cited by examiner

Primary Examiner—Kee M. Tung
Assistant Examiner—Tam Tran

(57) ABSTRACT

A method for calibrating a display using a plurality of visual stimuli. A plurality of visual stimuli having an associated digital count and an associated position are displayed. The digital count of each of the visual stimuli are adjusted wherein the plurality of visual stimuli are ordered and there are perceived lightness differences between the visual stimuli. An offset is estimated based on the digital count and the position of the visual stimuli. A gain is estimated based on the offset. A gamma is estimated based on the gain, the offset, the digital count and an estimate of luminance of the visual stimuli. An average gamma is estimated by determining the average value of the gamma for the plurality of visual stimuli. In one embodiment, the visual stimuli are a series of patches positioned in a row, each patch of having a pre-assigned gray level and having a visual control to lighten or darken the visual stimuli, wherein the gray level corresponds to the digital count.

31 Claims, 5 Drawing Sheets

400

410
Generating a normalized digital count for each patch

420
Generating a normalized position for each patch

430
Plotting the normalized digital count versus the normalized position for each patch

440
Generating a linear fit for the normalized digital count versus the normalized position for each patch

450
Determining the y-axis intercept of the linear fit, wherein the y-axis intercept is the offset

Figure 4

METHOD AND DEVICE FOR VISUAL CALIBRATION OF DISPLAYS

FIELD OF INVENTION

The present invention relates to the field of color displays. Specifically, the present invention relates to a method and device for visual calibration of displays.

BACKGROUND OF THE INVENTION

Color displays are an important component in any imaging workflow and often require calibration to ensure true color is presented on the displays. In certain fields, particularly the area of graphic design, it is essential to ensure that a display presents true color to ensure the color of the image. Currently, calibration can be carried out using either an optical measurement device, such as a luminance meter, or by visual calibration.

Display calibration is accomplished by ensuring that the gamma used for a display is correct. The gamma level controls the brightness of an image, thus images without the proper gamma can appear either too light or too dark. When the correct gamma is used, the images presented on a display are in true color, and thus accurately represent the color of the image.

As stated above, one way to determine the gamma of a display is by using an optical measurement device, such as a luminance meter. Colorimetric models exist which can accurately predict the tristimulus values of a given set of input RGB values for a specific monitor. However, these models require the measurement of a test target by an optical measurement device in order to fit the parameters of the model. Many display users do not own such measurement equipment, because the equipment is typically expensive. Furthermore, optical measurement devices may be difficult to operate and handle, thus reducing their desirability and usability.

Another way to determine the gamma of a display is by using a visual calibration procedure in which a human observer substitutes for a measurement device. There are currently a number of visual calibration procedures for determining gamma. For example, one procedure requires the observer to match stimuli, such as matching a uniform gray to a black and white checkerboard. The user adjusts the gray level of a square to match the lightness of a square consisting of a black and white checkerboard. The results of this adjustment can be used to estimate the gamma. The observer then adjusts the lightness of a dark square until it is just visible relative to the device black. The results of this adjustment can be used to estimate the offset term. This approach requires careful adjustment of both test patches and requires two steps in order to complete. There are also visual calibrations that make use of a printed reference sample to guide the user during calibration.

Accordingly, a need exists for a method for estimating the gamma level of a display without requiring the use of a physical reference standard, multiple screens, or the matching of stimuli. Furthermore, a need exists for a method that accomplishes the above need and is simple to use. A need also exists for a method that accomplishes the above needs and does not require the use of an optical measurement device.

SUMMARY OF THE INVENTION

The present invention provides a method for estimating the gamma level of a display without requiring the use of a physical reference standard, multiple screens, or the matching of stimuli. The present invention also provides a method that is simple to use and does not require the use of an optical measurement device.

A method for calibrating a display using a plurality of visual stimuli is presented. The present invention provides a process for visual display calibration that uses a multiple stimulus method of adjustment procedure to uniformly partition a lightness step ramp.

In one embodiment, a plurality of visual stimuli having an associated digital count and an associated position are displayed. In one embodiment, the visual stimuli are a series of patches positioned in a row, each patch having a pre-assigned gray level and having a visual control to lighten or darken the visual stimuli, wherein the gray level corresponds to the digital count. The digital count of each visual stimulus is adjusted wherein the plurality of visual stimuli are ordered and there are perceived lightness differences between the visual stimuli. An offset is estimated based on the digital count and the position of the visual stimuli. A gain is estimated based on the offset. A gamma is estimated based on the gain, the offset, the digital count and a luminance of the visual stimuli. An average gamma is estimated by determining the average value of the gamma for the plurality of visual stimuli.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a flow chart of the steps in a process for determining an offset for use in calibrating a display, in accordance with one embodiment of the invention.

DETAILED DESCRIPTION

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Figure 1:
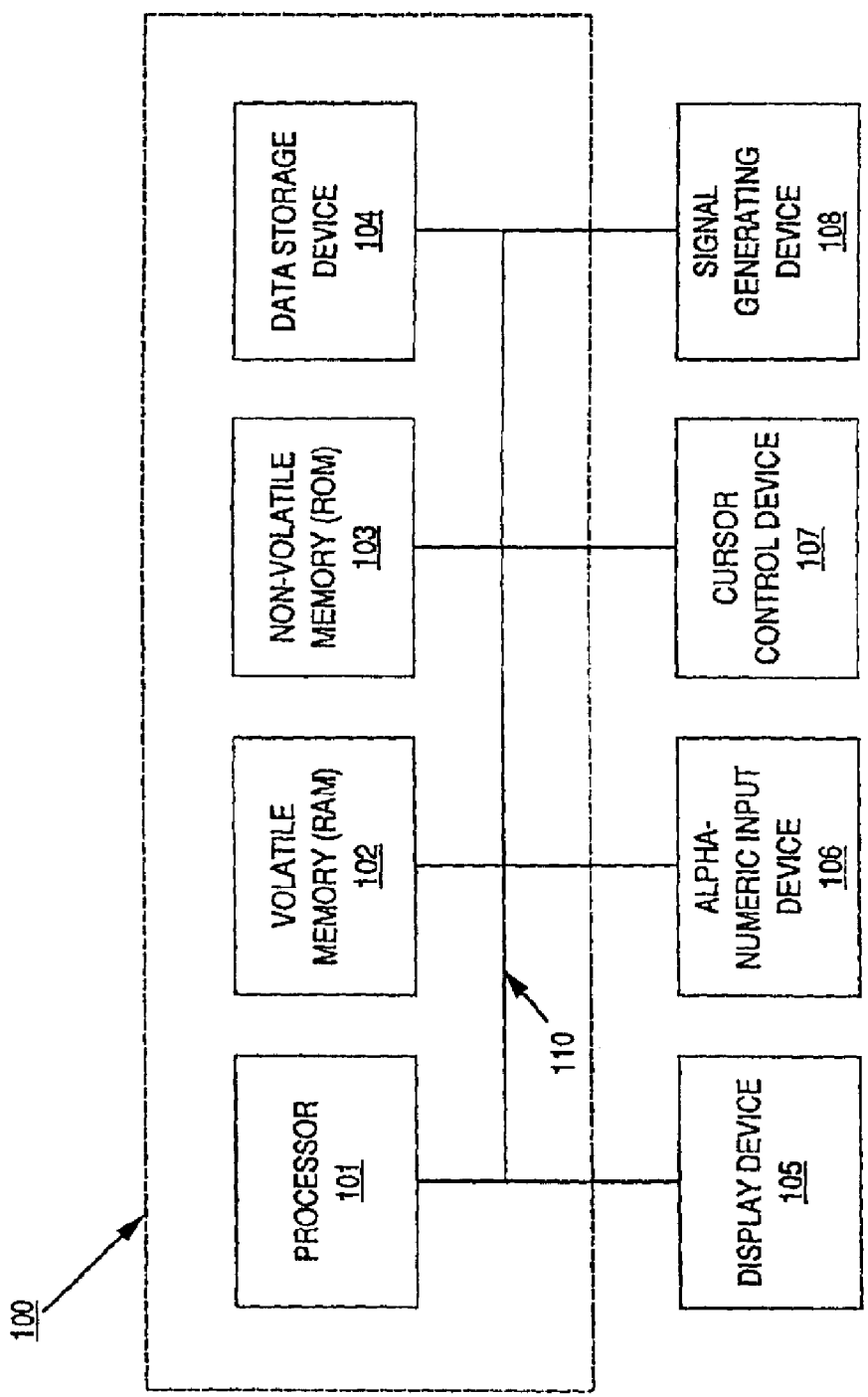
FIG. 1 is a block diagram depicting a computer system and computer readable media on which embodiments of the present invention may be practiced, in accordance with one embodiment of the invention.

With reference to FIG. 1, portions of the present invention are comprised of computer-readable and computer executable instructions which reside, for example, in computer-usable media of a computer system. FIG. 1 illustrates an exemplary computer system 100 on which embodiments (e.g., process 200 of FIG. 2 and process 400 of FIG. 4) of the present invention may be practiced. It is appreciated that computer system 100 of FIG. 1 is exemplary only and that the present invention can operate within a number of different computer systems including general purpose computer systems, embedded computer systems, and stand alone computer systems specially adapted for controlling automatic test equipment.

Computer system 100 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101.

Computer system 100 also includes a data storage device 104 ("computer-usable medium") such as a magnetic or optical disk and disk drive coupled with the bus 110 for storing information and instructions. Data storage device 104 can include one or more removable magnetic or optical storage media (e.g., diskettes, tapes) which are computer readable memories. Memory units of system 100 include volatile memory 102, non-volatile memory 103 and data storage device 104. In one embodiment, volatile memory 102 is partitioned to comprise a number of distinct, independently operating memory units.

Computer system 100 can further include an optional signal generating device 108 (e.g., a modem, or a network interface card "NIC") coupled to the bus 100 for interfacing with other computer systems. Also included in computer system 100 of FIG. 1 is an optional alphanumeric input device 106 including alphanumeric and function keys coupled to the bus 110 for communicating information and command selections to the central processor 101. Computer system 100 also includes an optional cursor control or directing device 107 coupled to the bus 110 for communicating user input information and command selections to the central processor 101. An optional display device 105 can also be coupled to the bus 110 for displaying information to the computer user. Display device 105 may be a liquid crystal device, other flat panel display, cathode ray tube, or other display device suitable for creating graphic images and alphanumeric characters recognizable to the user. Cursor control device 107 allows the computer user to dynamically signal the two dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

Figure 2:
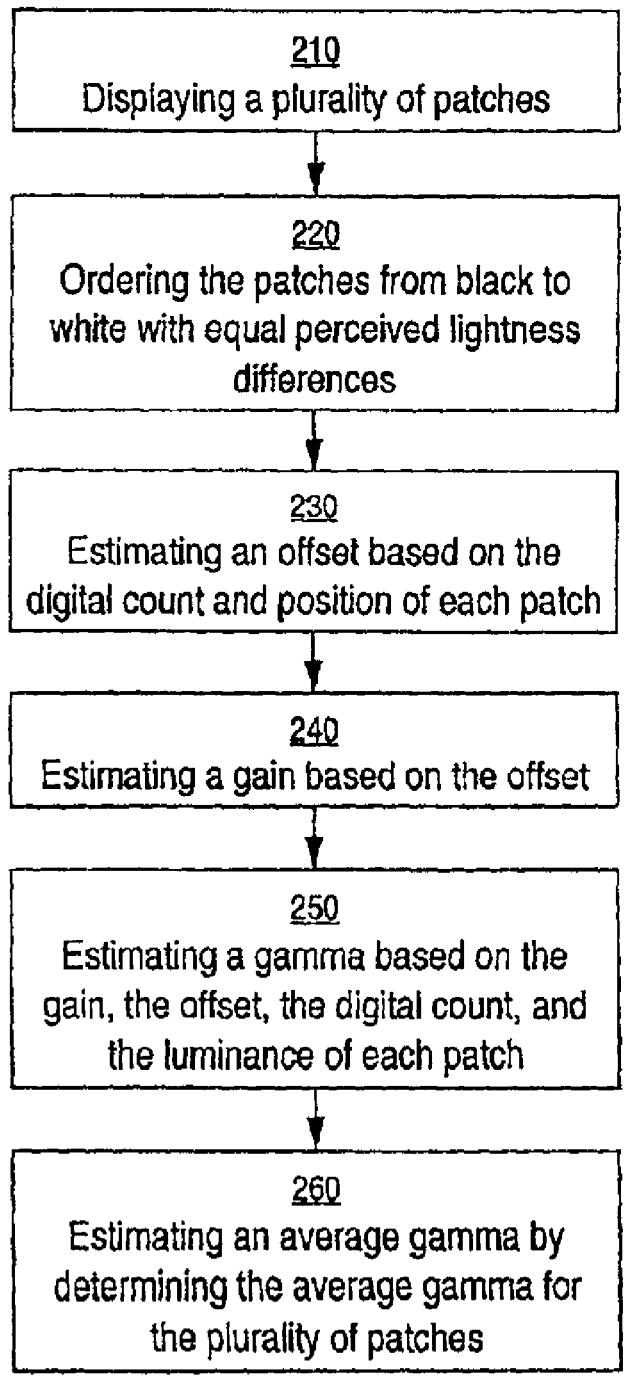
FIG. 2 is a flow chart of the steps in a process for visually calibrating a display, in accordance with one embodiment of the invention.

FIG. 2 is a flow chart of the steps in a process 200 for visually calibrating a display, in accordance with one embodiment of the invention. The present invention provides a process 200 for visual display calibration that uses a multiple stimulus adjustment procedure to uniformly partition a lightness step ramp.

At step 210, a plurality of visual stimuli (also referred to herein as "patches") are displayed on a display device (e.g., display device 105 of FIG. 1). Each visual stimulus has an associated digital count and an associated position. The digital count represents a quantized and unknown luminance increment. The associated position represents a constant lightness increment and, by extension, an estimated luminance.

Figure 3:
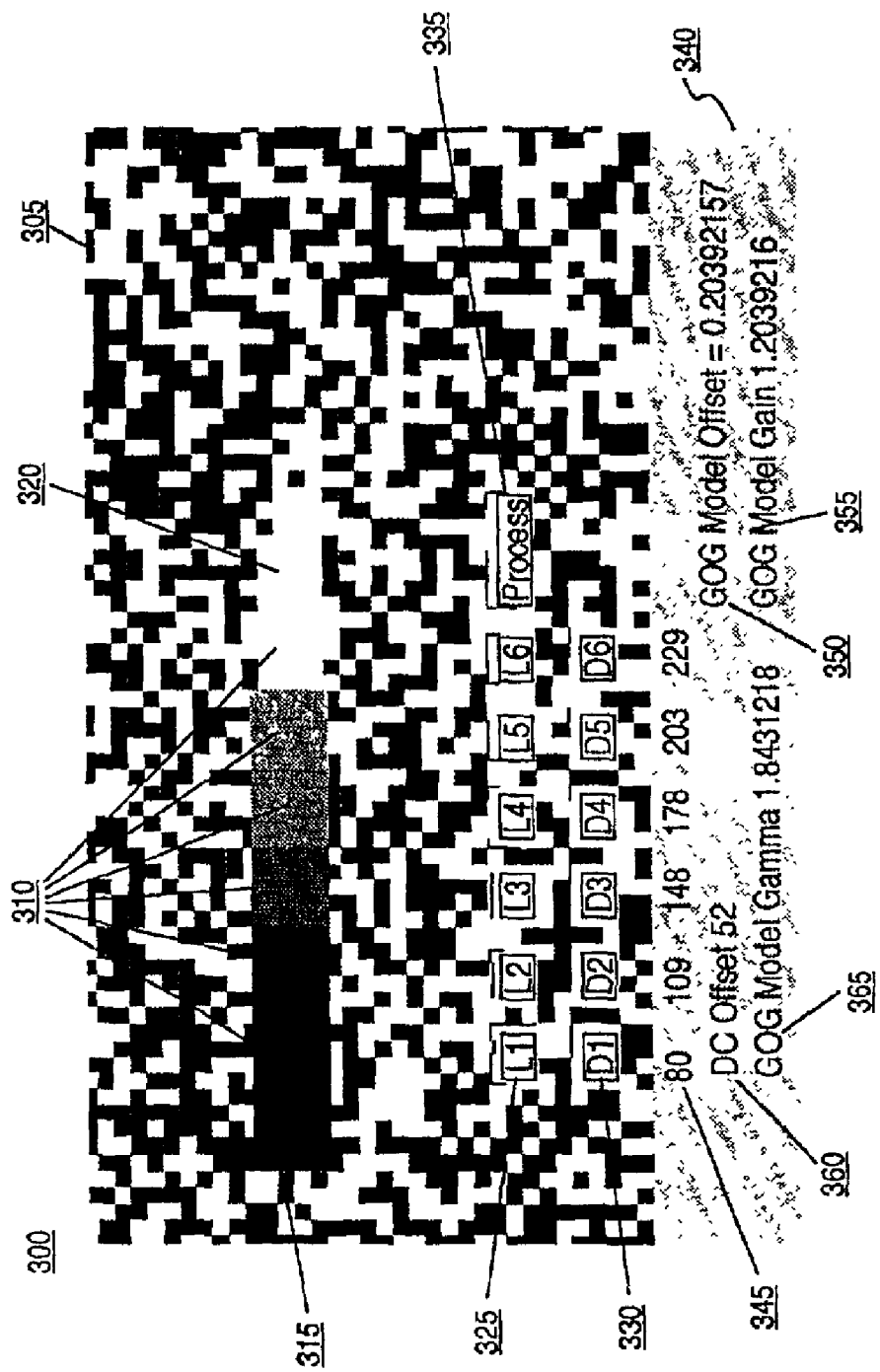
FIG. 3 illustrates an exemplary screen of a process for visually calibrating a display, in accordance with one embodiment of the invention.

FIG. 3 illustrates an exemplary screen 300 of a process for visually calibrating a display, in accordance with one embodiment of the invention. In one embodiment, the present invention provides a screen 300 filled with a background 305 consisting of coarse device black and device white noise. In one embodiment, background 305 comprises coarse device black and device white noise of 10 by 10 pixel squares. Device black corresponds to the minimum digital count that can be sent to the display (e.g., 0 of 255) and device white corresponds to the maximum digital count that can be sent to the display (e.g., 255 of 255).

Screen 300 further comprises a plurality of visual stimuli 310. In one embodiment, visual stimuli 310 are patches positioned in a horizontal row atop background 305. In one preferred embodiment, the patches are a series of eight 2 cm by 2 cm squares. In one embodiment, the patch furthest to the left is a device black anchor 315 and the patch furthest to the right is a device white anchor 320. The intermediate patches (e.g., visual stimuli 310) are randomly assigned gray levels.

Referring now to FIG. 2, at step 220, the visual stimuli (e.g., patches) are ordered by a user from darkest to lightest with equal perceived lightness differences. The user attempts to uniformly partition the lightness of a step ramp comprised of patches.

Referring now to FIG. 3, in one embodiment, each visual stimulus 310 has an accompanying set of visual controls. The visual controls comprise a lightener control 325 for lightening the corresponding visual stimulus 310 and a darkener control 330 for darkening the corresponding visual stimulus 310.

By using lightener control 325 and darkener control 330, a user can adjust each of the intermediate patches (e.g., visual stimuli 310). The intermediate patches are adjusted such that they are ordered and that there are equal perceived lightness differences between each of the squares. Each patch has a corresponding digital count, and by adjusting the lightness of each patch, the digital count is being adjusted. The user has an unlimited amount of time to individually adjust each of the squares. When the user is satisfied with the lightness spacing, process control 335 may be activated to generate calibration data.

Referring now to FIG. 2, at step 230, an offset value is estimated based on the digital count and relative position of each patch.

FIG. 4 is a flow chart of the steps in a process for determining an offset for use in calibrating a display, in accordance with one embodiment of the invention.

At step 410, a normalized digital count (Norm $DC_n$) is generated for each patch. Once the user has completed the lightness partitioning described previously at step 220 of FIG. 2, each of the intermediate patches has a digital count ($DC_n$) associated with it. The normalized digital count is determined according to Equation 1 as follows:

$$NormDC_n = \frac{DC_n}{255} \qquad \text{Equation 1}$$

where Norm $DC_n$ is the normalized digital count for a visual stimulus, $DC_n$ is the digital count for a visual stimulus, and n represents the visual stimulus.

At step 420, a normalized position (Norm $Position_n$) is generated for each patch. The position ($Position_n$) is the location from 1 to n (assuming n number of patches) that a given patch was originally in during the visual calibration process. The normalized position is determined according to Equation 1 as follows:

$$NormPosition_n = \frac{Position_n}{n-1} \quad \text{Equation 2}$$

where Norm Position$_n$ is the normalized position for a visual stimulus, Position$_n$ is the position for a visual stimulus, and n represents the visual stimulus.

In one preferred embodiment, there are eight patches used for calibrating a display. Thus, the normalized position for the first patch (device black anchor 315 of FIG. 3) is zero (e.g., 0/7), the normalized position for the second patch is 0.143 (1/7), etc.

At step 430, the normalized digital count is plotted versus the normalized position for each patch.

At step 440, a linear fit is generated for the plot of the normalized digital count versus the normalized position for each patch as plotted at step 430.

At step 450, the y-axis intercept of the linear fit generated at step 440 is determined. The offset is determined as the y-axis intercept.

Figure 5:
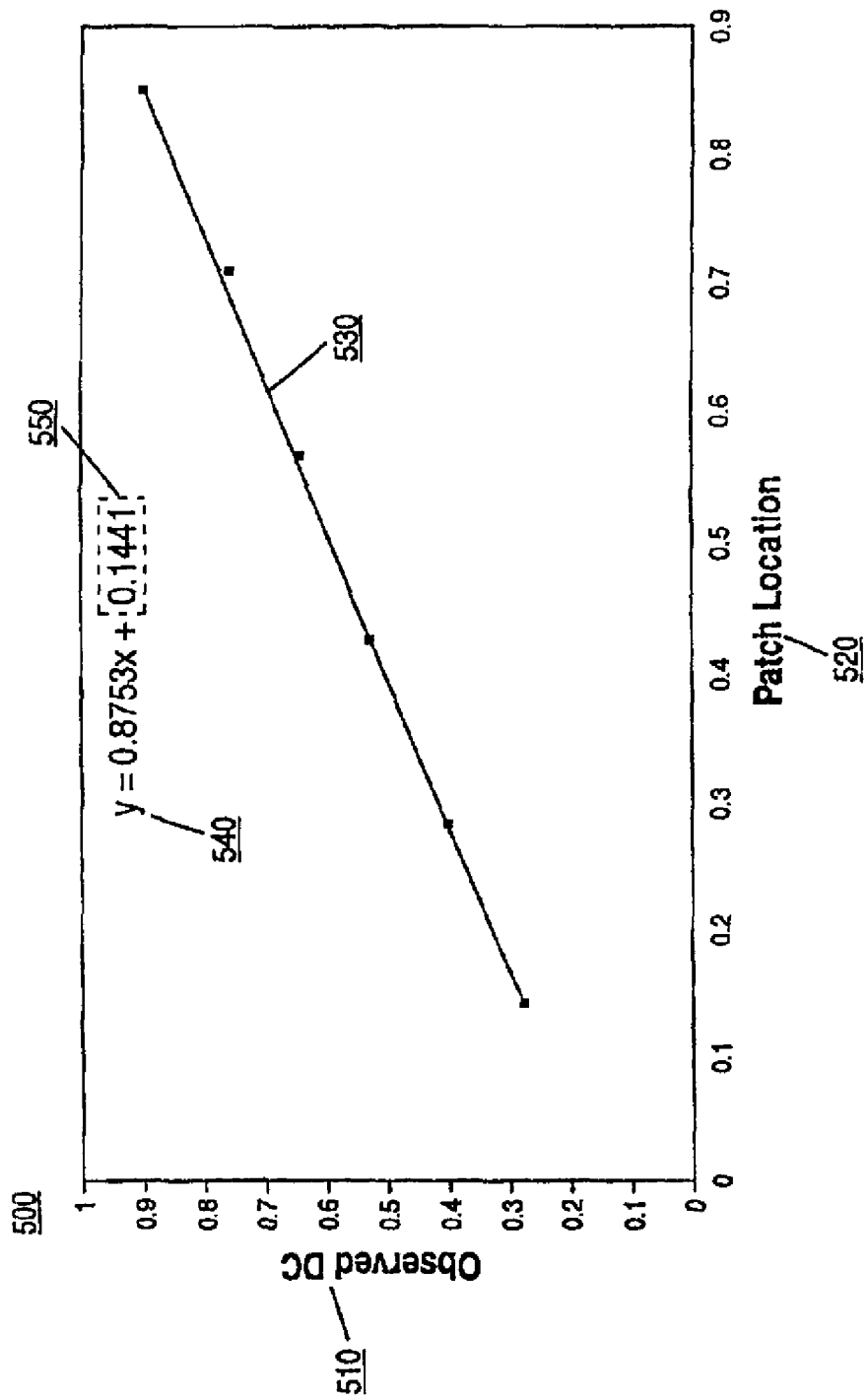
FIG. 5 illustrates an exemplary plot of normalized digital counts versus normalized patch positions for use in a process for determining an offset for calibrating a display, in accordance with one embodiment of the invention.

FIG. 5 illustrates an exemplary plot 500 of normalized digital counts versus normalized partition positions for use in a process for determining an offset for calibrating a display, in accordance with one embodiment of the invention.

FIG. 5 shows the observed data 510 (e.g., digital count for each visual stimulus) normalized to the range 0 to 1 and plotted versus the position 520 normalized to the range 0 to 1. The observations are shown as squares and the linear fit 530 to the data is shown as a solid black line. The fitted equation 540 is shown above the data. In plot 500, intercept value 550 for the fitted line is 0.1441. Intercept value 550 is the offset. It should be appreciated that intercept value 550 is exemplary, and that the intercept value will vary for different digital counts and displays.

Referring now to FIG. 2, at step 240, the gain is estimated based on the offset. In one embodiment, the gain is estimated according to equation 3 as follows:

$$\text{Gain} = 1 - \text{Offset} \quad \text{Equation 3}$$

At step 250, once the offset and gain have been estimated, the observer data can be used to optimize the gamma. In one embodiment, the gamma computed for each observer data point is determined. Specifically, given that the observer has attempted to uniformly partition the lightness scale it is possible to assign an estimated normalized luminance to each of the patches. Then given a gain and an offset it is possible to compute a gamma value that would result in that uniform partition. The gamma ($\gamma_n$) is estimated according to equation 4 as follows:

$$\gamma_n = \frac{\log(Y_n)}{\log((NormDC_n \cdot \text{Gain}) - \text{Offset})} \quad \text{Equation 4}$$

where $Y_n$ is the estimated normalized luminance for a visual stimulus, Norm DC$_n$ is the corresponding uniform sampling in normalized digital counts for a visual stimulus, and n represents the visual stimulus. The estimated normalized luminance for each visual stimulus is a predefined constant based on theoretical luminance spacing. This theoretical luminance spacing is based on the known cube-root function that can be used to compute lightness given luminance. Similarly, luminance can be calculated as the cube of normalized lightness.

At step 260, the gamma values for each of the visual stimuli are averaged in order to compute an average gamma.

Referring now to FIG. 3, in one embodiment, screen 300 also comprises output information box 340. Output information box 340 is for displaying the output of a process for calibrating a display. In one embodiment, output information box 340 comprises a digital count 345 for each visual stimulus 310, an normalized offset value 350, a normalized gain value 355, an offset value 360, and an average gamma value 365. Once average gamma value 365 is estimated, a display can be calibrated to ensure true color.

The preferred embodiment of the present invention, a method and device for visual calibration of displays, is thus described. While the present invention has been described in particular embodiments, it should be appreciated that the present invention should not be construed as limited by such embodiments, but rather construed according to the below claims.

What is claimed is:

1. A method for calibrating a display comprising:
   a) displaying a plurality of visual stimuli having an associated digital count and an associated position;
   b) adjusting said digital count of each of said visual stimuli wherein said plurality of visual stimuli are ordered and there are perceived lightness differences between said visual stimuli; and
   c) estimating a gamma based on said digital count and said position of said visual stimuli, said estimating including:
      c1) estimating an offset based on said digital count and said position of visual stimuli;
      c2) estimating a gain based on said offset; and
      c3) estimating said gamma based on said gain, said offset, said digital count and luminance of said visual stimuli.

2. A method as recited in claim 1 wherein step said c1) comprises:
   generating a normalized digital count by normalizing said digital count for said visual stimuli;
   plotting said normalized digital count versus a normalized position for said visual stimuli; and
   generating a linear fit for said normalized digital count versus a normalized position for said plurality of visual stimuli, said linear fit having a y-axis intercept, said y-axis intercept representing an estimation of said offset.

3. A method as recited in claim 2 wherein said gain is estimated according to the difference of one minus said offset.

4. A method as recited in claim 1 wherein said visual stimuli are a series of patches positioned in a row, each patch of said series of patches having a pre-assigned gray level and having a visual control to lighten said gray level of said visual stimuli and a visual control to darken said gray level of said visual stimuli, said gray level corresponding to said digital count.

5. A method as recited in claim 4 wherein said series of patches are positioned over a background of course device black and device white noise.

6. A method as recited in claim 4 wherein a first patch of said series of patches positioned furthest to the left of each said patch is device black and a second patch of said series of patches positioned furthest to the right of each said patch is device white.

7. A method as recited in claim 4 wherein said pre-assigned gray level of each said patch is randomly determined.

8. A method as recited in claim 1 wherein said perceived lightness differences between said visual stimuli are substantially equal.

9. A computer-usable medium having computer-readable program code embodied therein for causing a computer system to perform the display calibration steps of:
   a) displaying a plurality of visual stimuli such that each said visual stimulus has an associated digital count end an associated position, said displaying including simultaneously presenting said visual stimuli on a display of said computer system in an order that is based on said associated positions, said digital counts being representative of gray scale levels;
   b) enabling a user to input adjustments of said digital count of each of said visual stimuli wherein said plurality of visual stimuli are ordered and there are perceived lightness differences between said visual stimuli; and
   c) estimating a gamma based on said digital counts and said positions of said visual stimuli following said adjustments by said user, including:
      c1) estimating an offset based on said digital counts and said positions of said visual stimuli;
      c2) estimating a gain based on said offset; and
      c3) estimating said gamma based on said gain, said offset, said digital count and luminance of said visual stimuli.

10. A computer-usable medium as recited in claim 9 wherein step said c1) comprises:
   generating a normalized digital count for each said visual stimulus by normalizing said digital count for said visual stimulus;
   plotting said normalized digital count versus a normalized position for each said visual stimulus; and
   generating a linear fit for said normalized digital counts versus normalized positions for said plurality of visual stimuli, said linear fit having a y-axis intercept, said y-axis intercept representing an estimation of said offset.

11. A computer-usable medium as recited in claim 10 wherein said gain is estimated according to the difference of one minus said offset.

12. A computer-usable medium as recited in claim 11 wherein said gamma is estimated according to $$\gamma_n = \frac{\log(Y_n)}{\log((NormDC_n \cdot \text{gain}) - \text{offset})};$$

wherein said n is said visual stimuli;
wherein $\gamma_n$ is said gamma;
wherein said $Y_n$ is said luminance of said visual stimuli; and
wherein said Norm $DC_n$ is said normalized digital count of said visual stimuli.

13. A computer-usable medium as recited in claim 12 wherein an average gamma is estimated by determining an average value of said gamma for said plurality of visual stimuli.

14. A computer-usable medium as recited in claim 9 wherein said visual stimuli are a series of patches positioned in a row on said display of said computer system, each patch of said series of patches having a pre-assigned gray level and having a visual control to lighten said gray level of said visual stimuli and a visual control to darken said gray level of said visual stimuli, said visual controls being presented on said display to enable said adjustments by said user, said gray level corresponding to said digital count.

15. A computer-usable medium as recited in claim 14 wherein said series of patches are positioned over a background of course device black and device white noise.

16. A computer-usable medium as recited in claim 14 wherein a first patch of said series of patches positioned furthest to the left of each said patch is device black and a second patch of said series of patches positioned furthest to the right of each said patch is device white.

17. A computer-usable medium as recited in claim 14 wherein said pre-assigned gray level of each said patch is randomly determined.

18. A computer-usable medium as recited in claim 9 wherein said perceived lightness differences between said visual stimuli are substantially equal.

19. A computer system comprising:
   a bus;
   a display device coupled to said bus;
   a computer-readable memory coupled to said bus; and
   a processor coupled to said bus; said processor and computer programming within said memory being cooperative for executing a method for graphically presenting data on said display device, said method comprising the steps of:
   a) displaying a plurality of visual stimuli, each said visual stimulus having an associated digital count and an associated position;
   b) enabling a user to input adjustments of said digital count of each of said visual stimuli wherein said plurality of visual stimuli are ordered and there are perceived lightness differences between said visual stimuli; and
   c) estimating a gamma based on said digital counts and said positions of said visual stimuli following said adjustments; including
      c1) estimating an offset based on said digital counts and said positions of said visual stimuli following said adjustments;
      c2) estimating a gain based on said offset; and
      c3) estimating said gamma based on said gain, paid offset, said digital counts and luminance said visual stimuli.

20. A computer system as recited in claim 19 wherein step said c1) comprises:
   generating a normalized digital count for each said visual stimulus by normalizing said digital count for said visual stimulus;
   plotting said normalized digital count versus a normalized position for said visual stimulus; and
   generating a linear fit for said normalized digital counts versus normalized positions for said plurality of visual stimuli, said linear fit having a y-axis intercept, said y-axis intercept representing an estimation of said offset.

21. A computer system as recited in claim 20 wherein said gain is estimated according to the difference of one minus said offset.

22. A computer system as recited in claim 21 wherein said gamma is estimated according to $$\gamma_n = \frac{\log(Y_n)}{\log((NormDC_n \cdot \text{gain}) - \text{offset})};$$

wherein n is said visual stimuli;

wherein $\gamma_n$ is said gamma;

wherein said $Y_n$ is said luminance of said visual stimuli; and wherein, said Norm $DC_n$ is said normalized digital count of said visual stimuli.

23. A computer system as recited in claim 22 wherein an average gamma is estimated by determining an average value of said gamma for said plurality of visual stimuli.

24. A computer system as recited in claim 19 wherein said visual stimuli are a series of patches positioned in a row on said display device, each patch of said series of patches having a pro-assigned gray level and having a visual control to lighten said gray level of said visual stimuli and a visual control to darken said gray level of said visual stimuli, said gray level corresponding to said digital count.

25. A computer system as recited in claim 24 wherein said series of patches are positioned over a background of course device black and device white noise.

26. A computer system as recited in claim 24 wherein a first patch of said series of patches positioned furthest to the left of each said patch is device black and a second patch of said series of patches positioned furthest to the right of each said patch is device white.

27. A computer system as recited in claim 24 wherein said pre-assigned gray level of each said patch is randomly determined.

28. A computer system as recited in claim 19 wherein said perceived lightness differences between said visual stimuli are substantially equal.

29. A method for calibrating a display comprising:
   a) displaying a plurality of visual stimuli, each having an associated digital count and an associated position;
   b) adjusting said digital count of each of said visual stimuli wherein said plurality of visual stimuli are ordered and there are perceived lightness differences between said visual stimuli; and
   c) estimating a gamma based on said digital count and said position of said visual stimuli, said estimating comprising:
      c1) estimating an offset based on said digital count and said position of said visual stimuli wherein estimating said offset includes substeps of (1) generating a normalized digital count by normalizing said digital count for said visual stimuli, (2) plotting said normalized digital count versus a normalized position for said visual stimuli, and (3) generating a linear fit for said normalized digital count versus a normalized position for said plurality of visual stimuli, said linear fit having a y-axis intercept, said y-axis intercept representing an estimation of said offset;
      c2) estimating a gain according to the difference of one minus said offset; and
      c3) estimating a gamma based on said gain, said offset, said digital count and luminance of said visual stimuli, wherein said gamma is estimated according to $$\gamma_n = \frac{\log(Y_n)}{\log((NormDC_n \cdot \text{gain}) - \text{offset})};$$

wherein said n is said visual stimuli:

wherein said $\gamma_n$ is said gamma:

wherein said $Y_n$ is said luminance of said visual stimuli; and wherein said Norm $DC_n$ is said normalized digital count of said visual stimuli.

30. A method as recited in claim 29 wherein an average gamma is estimated by determining an average value of said gamma for said plurality of visual stimuli.

31. A method for calibrating a display comprising:
   a) displaying a plurality of visual stimuli having an associated digital count and an associated position, said visual stimuli incision at least two intermediate visual stimuli between end visual stimuli;
   b) adjusting said digital count of each said intermediate visual stimulus to achieve a perceived difference in lightness between adjacent said visual stimuli, wherein said visual stimuli are ordered within said plurality on a basis of a continuum between darkest and lightest and there are equal perceived lightness differences between adjacent pairs of said visual stimuli; and
   c) estimating a gamma based on said digital count and said position of said visual stimuli.

* * * * *